(12) United States Patent
Dale

(10) Patent No.: US 7,950,683 B1
(45) Date of Patent: May 31, 2011

(54) DEVICE AND METHOD FOR MODIFYING A BICYCLE FOR FREESTYLE RIDING

(76) Inventor: John Dale, Tucson, AZ (US)

( * ) Notice: Subject to any disclaimer, the term of this patent is extended or adjusted under 35 U.S.C. 154(b) by 100 days.

(21) Appl. No.: 12/432,597

(22) Filed: Apr. 29, 2009

Related U.S. Application Data

(60) Provisional application No. 61/125,779, filed on Apr. 29, 2008.

(51) Int. Cl.
*B62J 25/00* (2006.01)
(52) U.S. Cl. ......... 280/291; 280/294; 280/295; 280/259
(58) Field of Classification Search .................. 280/291, 280/294, 295, 259
See application file for complete search history.

(56) References Cited

U.S. PATENT DOCUMENTS

| | | | |
|---|---|---|---|
| 6,729,204 B1* | 5/2004 | Chen | 74/594.6 |
| 6,863,292 B1* | 3/2005 | Paasch et al. | 280/291 |
| 2002/0100343 A1* | 8/2002 | Okajima et al. | 74/594.4 |
| 2003/0029271 A1* | 2/2003 | Shuman | 74/594.6 |
| 2004/0130119 A1* | 7/2004 | Muraoka et al. | 280/259 |
| 2005/0204860 A1* | 9/2005 | Winefordner et al. | 74/594.1 |
| 2007/0204720 A1* | 9/2007 | Poyzer | 74/539 |
| 2009/0095122 A1* | 4/2009 | Weagle | 74/560 |
| 2009/0095123 A1* | 4/2009 | Weagle | 74/560 |
| 2010/0059955 A1* | 3/2010 | Steinbach | 280/87.041 |

* cited by examiner

*Primary Examiner* — Joanne Silbermann
*Assistant Examiner* — Tashiana Adams
(74) *Attorney, Agent, or Firm* — Hayes Soloway P.C.

(57) ABSTRACT

The present disclosure provides a kit and method for modifying a bicycle comprising attaching a platform to both sides of the bottom bracket crank spindle in place of a crank set and chain. The platforms include internal spindle slots adapted to crank spindle shape through which a screw or other fastener may be used to temporarily attach the platform to the bottom bracket crank spindle.

8 Claims, 4 Drawing Sheets

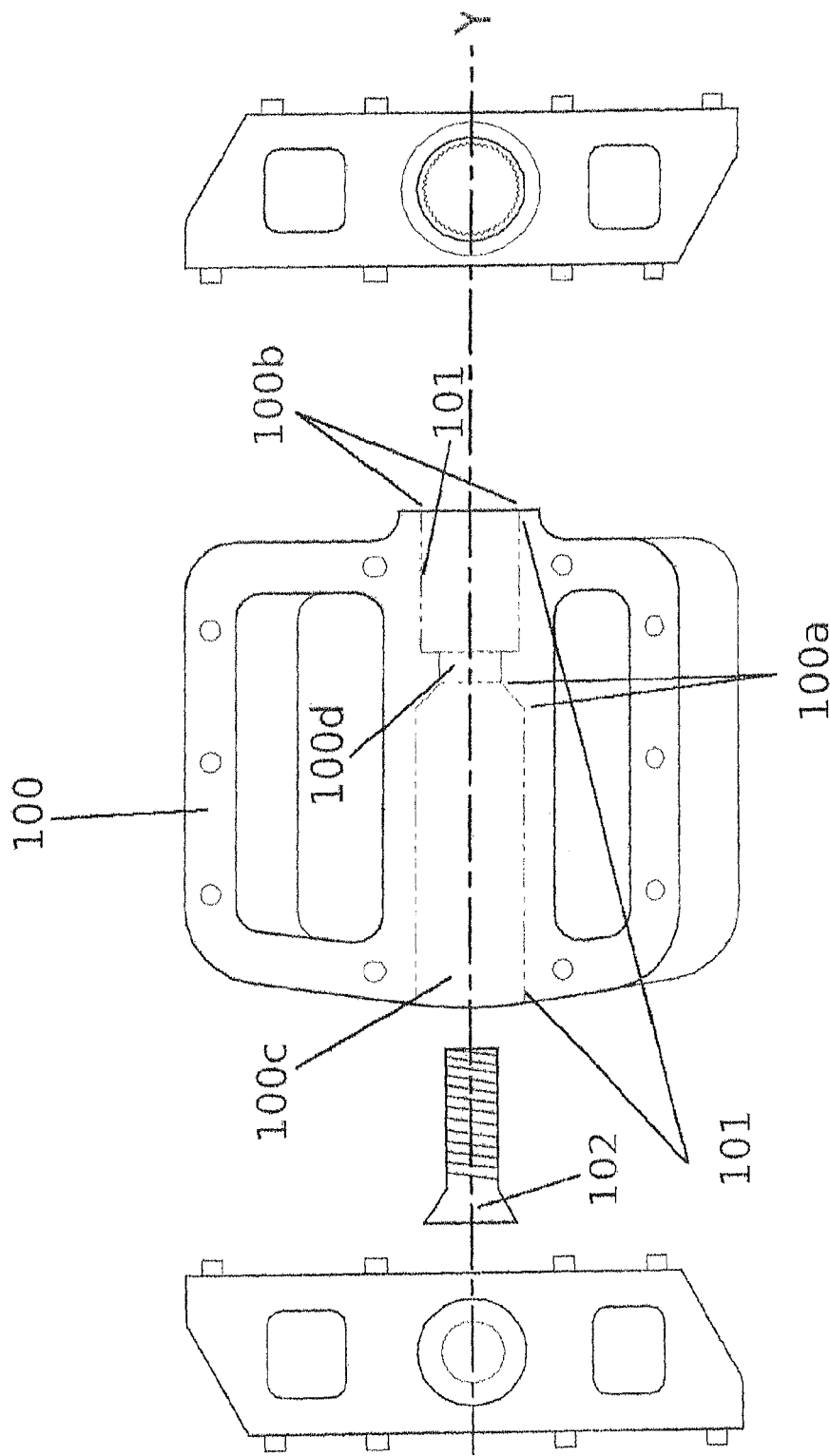

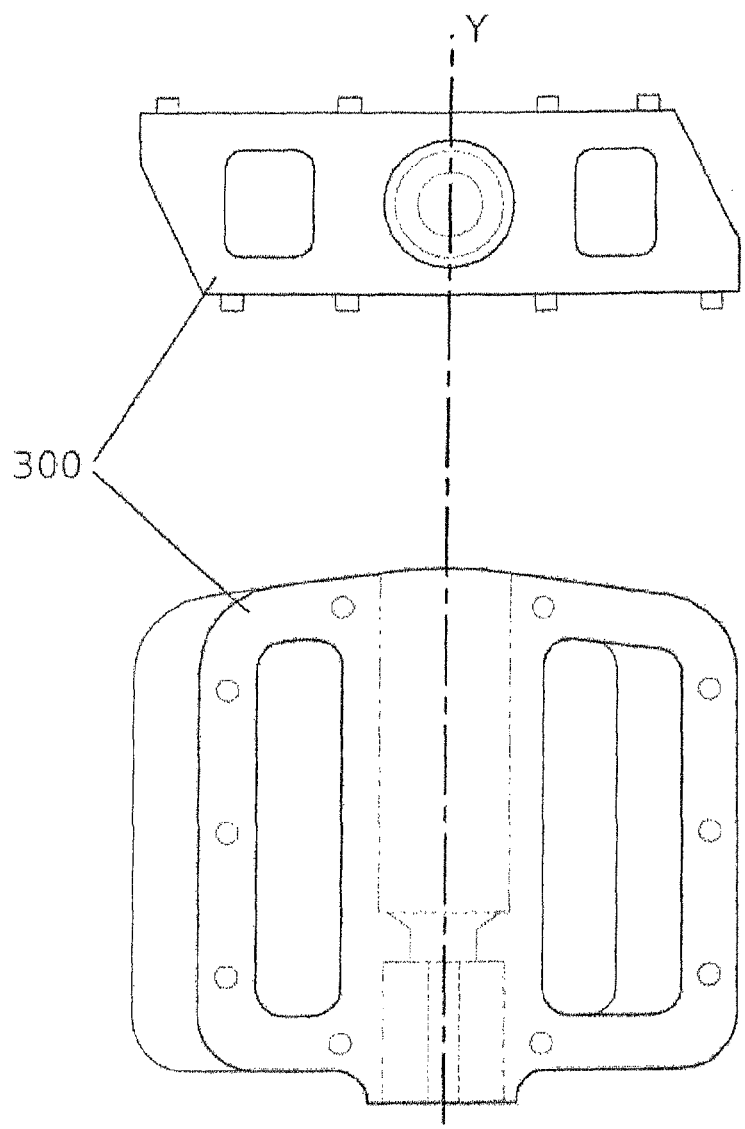
FIG. 3A
FIG. 3B
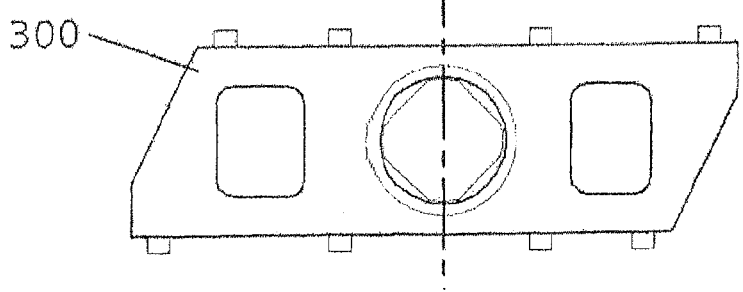
FIG. 3C

US 7,950,683 B1

DEVICE AND METHOD FOR MODIFYING A BICYCLE FOR FREESTYLE RIDING

CROSS-REFERENCE TO RELATED APPLICATIONS

This application claims priority from U.S. provisional application Ser. No. 61/125,779, filed Apr. 29, 2008.

FIELD OF THE INVENTION

The present invention relates generally to a bicycle accessory that can be adapted to an alternative form of cycling and a method for the adaptation of a bicycle.

BACKGROUND OF THE INVENTION

Bicycle Motocross (BMX) riding has been among the most popular recreational activities for decades now. As the sport has grown, innovative riders have continued to seek out new challenges and venues. Today, the popularity of freestyle BMX is believed to rival or exceed that of racing.

Municipalities worldwide continue to invest millions in large, transitioned facilities, including clay/dirt race tracks, concrete pool-style parks, and wood jump-style parks. The increasing pervasiveness of such facilities has beckoned a new genre of riding, wherein the rider uses centripetal force and gravity to gain or maintain speed without the use of the drive train. This method of propulsion is called "flow." Riders mastering "flow" exhibit superior bicycle control and place well in competitions.

Typically, the most popular and readily available place for this new type of riding is the local skate park. Unfortunately, many skate park managers exclude BMX (Bicycle Motocross) riders from many parks, arguably stunting the BMX market. Those in favor of excluding cyclists from skate parks claim that BMX riding damages skate park facilities and endangers other patrons.

Accordingly, the market is in the need for a BMX design that enhances safety and reduces the likelihood of damaging park facilities without sacrificing the enjoyment of freestyle BMX.

Current solutions include the use of plastic guards on pegs and pedals to reduce damage to ramps and other skate park structures. This option, however, fails to enhance safety. Other solutions have been attempted including the use of BMX pegs and wheel axles through the bottom bracket. However, round pegs are uncomfortable to ride for extended periods of time, and they make the switching to and from a standard drive-train very cumbersome.

SUMMARY OF THE INVENTION

The present disclosure addresses the problems associated with the prior art by providing a kit and method for modifying a bicycle by attaching a platform to both sides of the bottom bracket crank spindle in place of a crank set and chain. The rear sprocket may also be removed. Because the bicycle operates on the principles of "flow" and because the platforms are stable and predictable compared to the pedals attached to a crankset, the present disclosure drastically enhances the safety of the bicycle in freestyle riding.

In one aspect, the present disclosure provides a kit for modifying a bicycle for freestyle riding, comprising a pair of platforms adapted to attach directly to a bottom bracket crank spindle. The platforms are flat on at least one side, preferably both, so that the rider's feet will rest comfortably on the platforms when riding. Further, the platforms are capable of rotating to enhance the comfort and control of the rider. Another aspect of the present disclosure provides a method for modifying a BMA-type bicycle, comprising removing the crank lever, sprockets, and chain from the bicycle, while leaving the bottom bracket crank spindle intact, and attaching a device as described below in greater detail to the bottom bracket crank spindle.

BRIEF DESCRIPTION OF THE DRAWINGS

Further features and advantages of the present invention will be seen from the following detailed description, taken in conjunction with the accompanying drawings, wherein FIGS. 1A-1C, are front, top, and back elevational views, respectively, of an exemplary platform according to the present disclosure;

FIGS. 2A-2C and 3A-3C are front, top, and back detailed illustrations showing different embodiments for adapting the device of the present disclosure to different crank spindle designs.

DETAILED DESCRIPTION OF PREFERRED EMBODIMENTS

In the following description, reference is made to the accompanying drawings, which form a part hereof, and in which is shown, by way of illustration, various embodiments of the present invention. It is understood that other embodiments may be utilized and changes may be made without departing from the scope of the present invention.

In understanding the present disclosure, it is important to consider that bicycle riding does not, in fact, require a drive train. It can be demonstrated that through the act of "pumping", the rider can gain sufficient speed without the use of the bicycle drive train. In particular, the practice of "pumping" or alternatively, "flowing" a bicycle has become increasingly popular for freestyle cyclists. With regard to (but not limited to) the activities of Bicycle Motocross (BMX) and BMX Freestyle, the bicycles' drive trains are slowly becoming obviated. Riders remove chains and sprockets to reduce weight, and "pump" to gain momentum. Similar to skiing, ice skating, and roller skating, the bicycle rider can gain speed without sprockets, cranks, and chains.

The present disclosure provides a novel kit that allows the rider to remove the drive train temporarily, replacing it with pedal-like platform adapters that press directly onto standard-sized bottom-bracket spindles. The kit of the present disclosure reduces the overall weight of the freestyle bicycle, encourages symmetric muscle and joint development in bicycle riders, prevents injuries to the shins and knees, and allows a rider to easily revert hack to a drive train.

Figure 4:
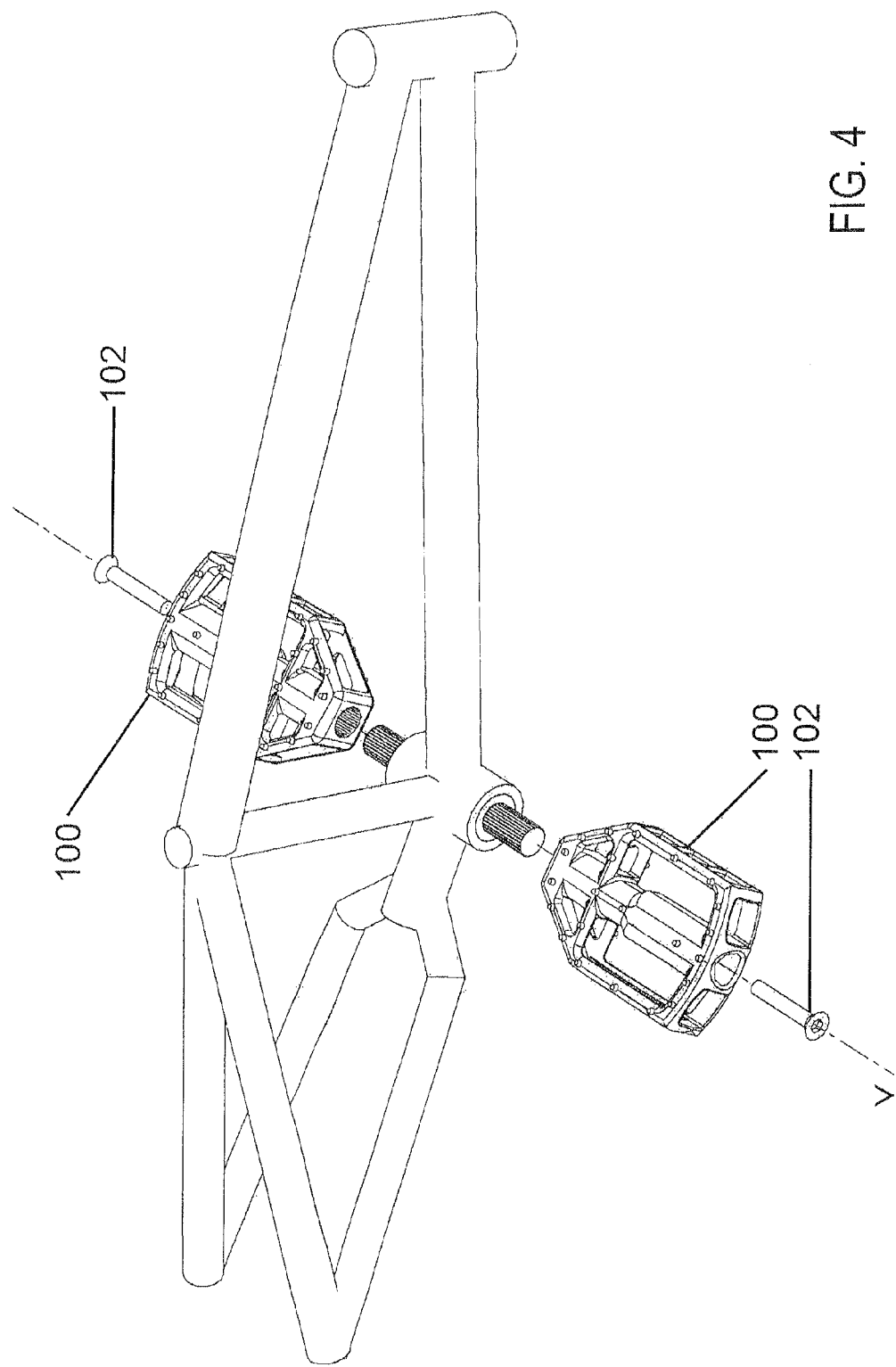
FIG. 4 is a partial perspective view of a bicycle with the device installed.

FIGS. 1A-1C display one of the two devices that make up a kit for modifying a bicycle according to the present disclosure. The device comprises a platform 100 that extends along axis y. The platform includes an internal spindle slot 100*b* for fitting over a bicycle bottom bracket crank spindle (shown in phantom at 101). Upon removing the sprockets and chain, the platform may be attached to the crank spindle using a fastener 102, such as a screw or bolt. When attached, the platform may be allowed to rotate around the axis y, which aligns with the rotational axis of the crank spindle. (See FIG. 4).

The fastener should be capable of being removed and reattached so that the cyclist can reassemble the drive train when desired. Permanent attachments, however, are also considered within the scope of the present disclosure. The fastener is attached via access hole 100c. The access hole 100c and internal spindle slot 100b are connected by a smaller diameter hole 100d, which may be threaded for the use of a screw or bolt as a fastener. As shown, one side of the hole may be counter-sunk 100a.

Figure 2A:
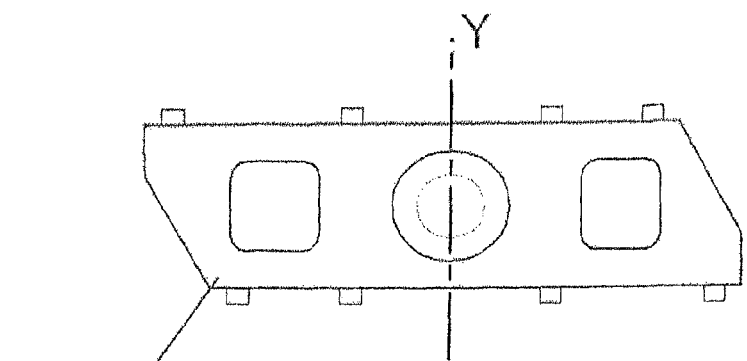
Figure 2B:
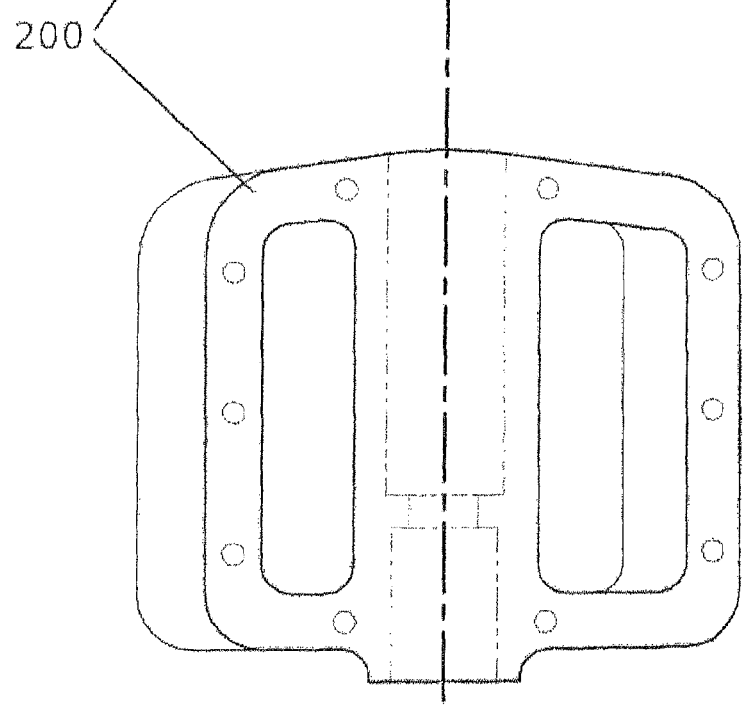
Figure 2C:
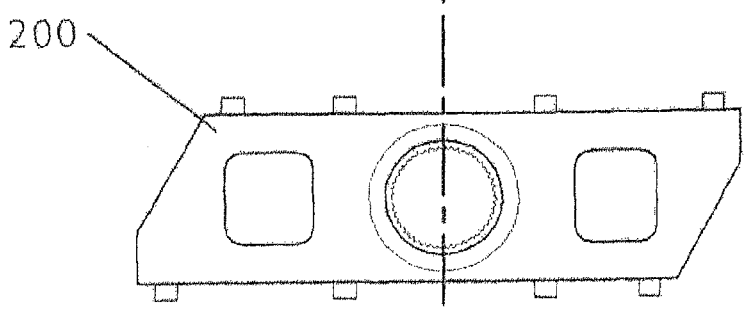

FIGS. 2A-2C show a platform 200 that has been designed to accommodate a typical 48-spline, 19 mm bottom-bracket spindle. In contrast, the platform 300 shown in FIGS. 3A-3C accommodates a typical 22 mm bottom-bracket spindle with squared ends.

The platform may take any number of shapes, as is commonly known in the art. The configuration of the platform as a pedal-like cage is merely exemplary.

As will be evident to one having skill in the art, the advantages of the kit and method of the present disclosure are significant. The platform disclosed herein reduces the dangers associated with BMX riding in a skate park. Slipping pedals causes the majority of crashes. Comparatively, the platforms described herein are stable, predictable, and rigid, reducing the likelihood of a crash. "Flowing" a freestyle park is the process of gaining or maintaining speed in a varied terrain without the use of a drive train. The device disclosed herein emphasizes flow and purity of motion without the use of a drive train.

The present disclosure also reduces the amount of damage to the facility, particularly if proper materials known in the art are use, including for example polymers, composites, malleable metals, or a combination thereof.

These advantages are obtained while enhancing the enjoyment of the experience for the freestyle BMX rider. As recreational riders explore new ways of performing stunts on bicycles, the weight and strength of the bicycle factor into purchasing decisions. Many riders factor weight-savings per dollar cost into new parts purchasing decisions. The kit and method of the present disclosure shave up to 3 lbs from a typical bicycle without compromising strength.

It should be emphasized that the above-described embodiments of the present kit and method are merely possible examples of implementations and merely set forth for a clear understanding of the principles of the invention. Many different embodiments of the kit and method described herein may be designed and/or fabricated without departing from the spirit and scope of the invention. All these and other such modifications and variations are intended to be included herein within the scope of this disclosure and protected by the following claims. Therefore the scope of the invention is not intended to be limited except as indicated in the appended claims.

The invention claimed is:

1. A method for modifying a bicycle, comprising removing the crank lever, sprockets, and chain from the bicycle, while leaving the bottom bracket crank spindle intact, and attaching a pair of platforms directly to the bottom bracket crank spindle, wherein each of the platforms provides at least one substantially flat surface for a rider's feet.

2. A bicycle having a bottom bracket crank spindle, and comprising a pair of platforms mounted directly to the bicycle bottom bracket crank spindle, wherein each of the platforms provides at least one substantially flat surface for a rider's feet.

3. The bicycle of claim 2, wherein the platforms are rotatably mounted about the bottom bracket crank spindle.

4. The bicycle of claim 2, wherein the platforms are pedal-like cages comprising a tubular body section having a internal slot for attaching to the bottom bracket crank spindle.

5. The bicycle of claim 2, wherein the bicycle is a BMX-type bicycle.

6. The method of claim 1, wherein the platforms are rotatably mounted about the bottom bracket crank spindle.

7. The method of claim 1, wherein the platforms are pedal-like cages comprising a tubular body section having a internal slot for attaching to the bottom bracket crank spindle.

8. The method of claim 1, wherein the bicycle is a BMX-type bicycle.

* * * * *